United States Patent

Nagae

(10) Patent No.: US 8,351,775 B2
(45) Date of Patent: Jan. 8, 2013

(54) LENS BARREL AND IMAGE PICKUP APPARATUS

(75) Inventor: Ryuichi Nagae, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/832,456

(22) Filed: Jul. 8, 2010

(65) Prior Publication Data

US 2011/0013897 A1    Jan. 20, 2011

(30) Foreign Application Priority Data

Jul. 14, 2009 (JP) .................................. 2009-165341

(51) Int. Cl.
G03B 17/00 (2006.01)
G02B 15/14 (2006.01)
G02B 7/02 (2006.01)

(52) U.S. Cl. ............ 396/83; 359/694; 359/822; 359/823

(58) Field of Classification Search .................... 396/72, 396/79, 82, 83, 85, 89, 133, 348, 349; 359/823, 359/694, 698–701, 822

See application file for complete search history.

(56) References Cited

U.S. PATENT DOCUMENTS

| 5,652,922 A | * | 7/1997 | Kohno | 396/72 |
| 5,751,500 A | * | 5/1998 | Bedzyk | 359/740 |
| 6,980,370 B2 | * | 12/2005 | Namai | 359/694 |
| 2011/0007409 A1 | * | 1/2011 | Nagae | 359/825 |

FOREIGN PATENT DOCUMENTS

| JP | 07-013059 | 1/1995 |
| JP | 2004-233925 | 8/2004 |

* cited by examiner

*Primary Examiner* — W. B. Perkey
*Assistant Examiner* — Minh Phan
(74) *Attorney, Agent, or Firm* — Cowan, Liebowitz & Latman, P.C.

(57) ABSTRACT

A lens barrel includes a drive ring having a hollow cylindrical shape and a gear by which the drive ring is configured to rotate around an optical axis, and a lens holder configured to move in an optical axis direction relative to the drive ring and to hold a lens and located inside of the drive ring, the lens holder including an arm extending to outside of the drive ring. The drive ring has a notch that extends in a circumferential direction of the drive ring so that the notch cannot overlap the gear. The arm of the lens holder is configured to enter and retreat from the notch of the drive ring.

4 Claims, 8 Drawing Sheets

LENS BARREL AND IMAGE PICKUP APPARATUS

BACKGROUND OF THE INVENTION

1. Field of the Invention

The present invention relates to a lens barrel and an image pickup apparatus.

2. Description of the Related Art

Japanese Patent Laid-Open No. ("JP") 7-13059 proposes a driving method configured to drive a lens barrel with a small structure by providing a gear to a cam ring. JP 2004-233925 proposes a technology configured to increase a driving amount of a focus lens without influencing a driving unit in the lens barrel.

However, JP 7-13059 is silent about a reduction of a length of a third cylinder unit in the optical axis direction, which includes a drive ring and a lens holder configured to hold a third lens from an object side. In addition, in JP 2004-233925, a third cylinder unit that includes a three-group lens frame is long in the optical axis direction. Therefore, there has been a demand of a further miniaturization of the lens barrel in addition to stable projecting and retracting.

SUMMARY OF THE INVENTION

The present invention provides a small lens barrel that can realize stable projecting and retracting and an image pickup apparatus.

A lens barrel according to one aspect of the present invention includes a drive ring having a hollow cylindrical shape and a gear by which the drive ring is configured to rotate around an optical axis, and a lens holder configured to move in an optical axis direction relative to the drive ring and to hold a lens and located inside of the drive ring, the lens holder including an arm extending to outside of the drive ring. The drive ring has a notch that extends in a circumferential direction of the drive ring so that the notch cannot overlap the gear. The arm of the lens holder is configured to enter and retreat from the notch of the drive ring.

A lens barrel according to one aspect of the present invention includes a drive ring having a hollow cylindrical shape and configured to rotate around an optical axis, a lens holder configured to move in an optical axis direction relative to the drive ring and to hold a lens and located inside of the drive ring, the lens holder including an arm extending to outside of the drive ring, and a flexible printed circuit board configured to connect inside of the drive ring to outside of the drive ring. The drive ring has a notch and a perforation groove so that the notch and the perforation groove cannot overlap each other in a circumferential direction. The arm of the lens holder is configured to enter and retreat from the notch of the drive ring. The flexible printed circuit board perforates through the perforation hole of the drive ring.

An image pickup apparatus including one of the above lens barrel also constitutes another aspect of the present invention.

Further features of the present invention will become apparent from the following description of exemplary embodiments with reference to the attached drawings.

DESCRIPTION OF THE EMBODIMENTS

Figure 2:
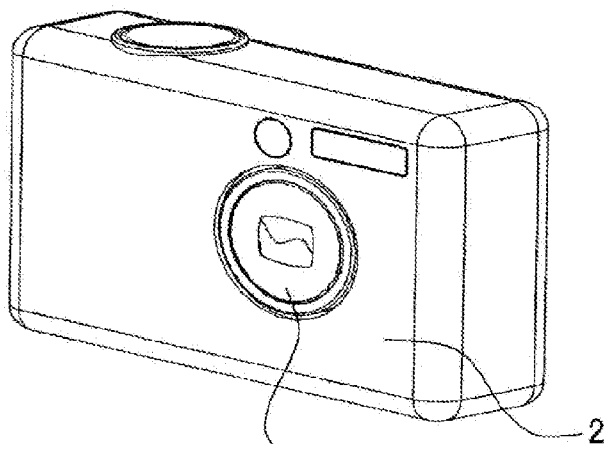
FIG. 2 is a perspective view of the image pickup apparatus according to this embodiment.

FIG. 2 is a perspective view of a camera (image pickup apparatus) 1 of this embodiment. As illustrated in FIG. 2, the camera 1 includes a camera housing 2 and a lens barrel 3. The lens barrel 3 is a retractable lens barrel configured to extend or project from a front surface of the camera housing 2 at the image pickup time and to retract into the camera body 2 at the non-image pickup time, and its miniaturization is demanded. The camera housing 2 houses a variety of components including a focus station. The lens barrel 3 can change a focal length of an image pickup lens.

Figure 3:
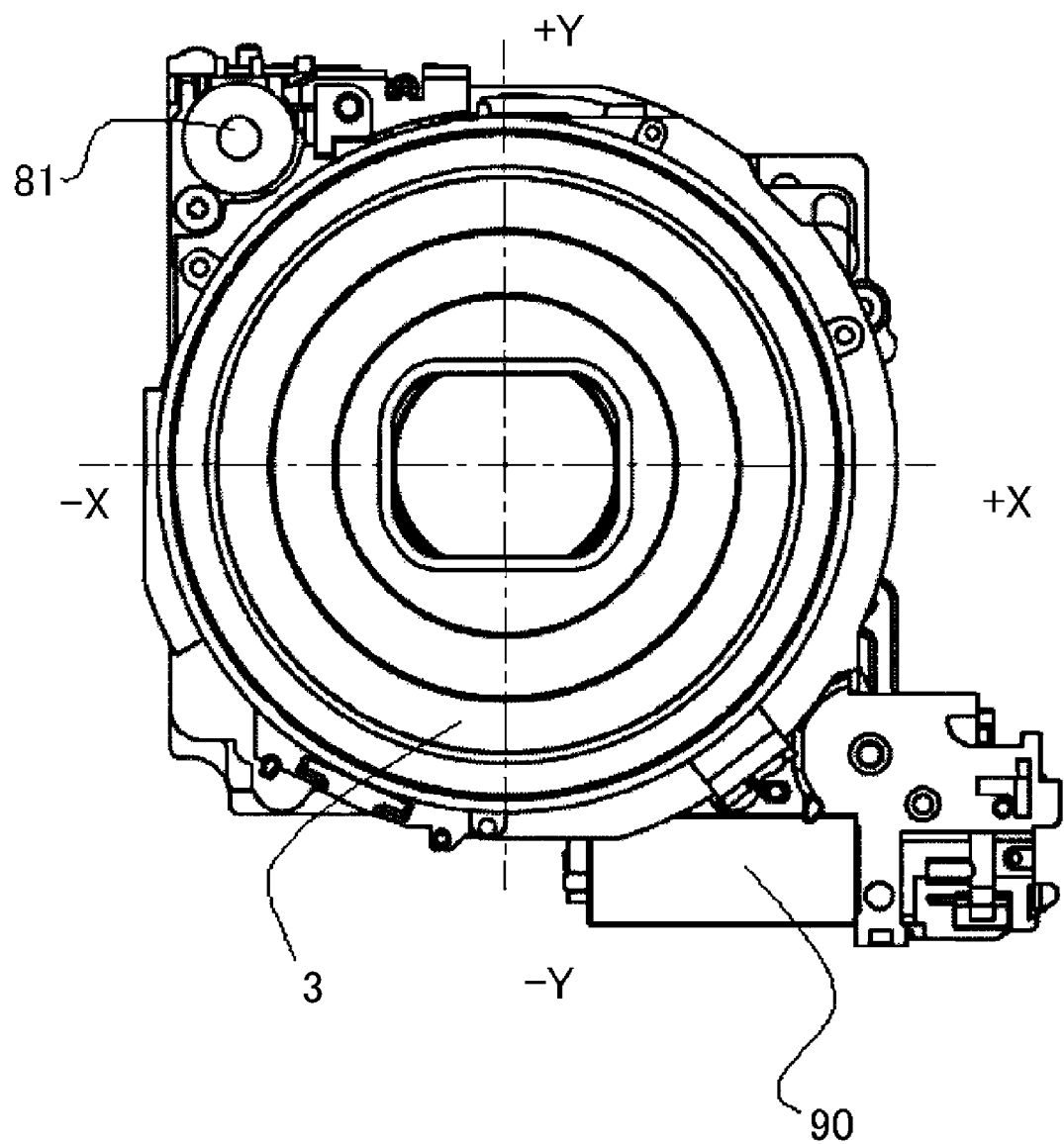
FIG. 3 is a front view of the lens barrel illustrated in FIG. 1.
Figure 4:
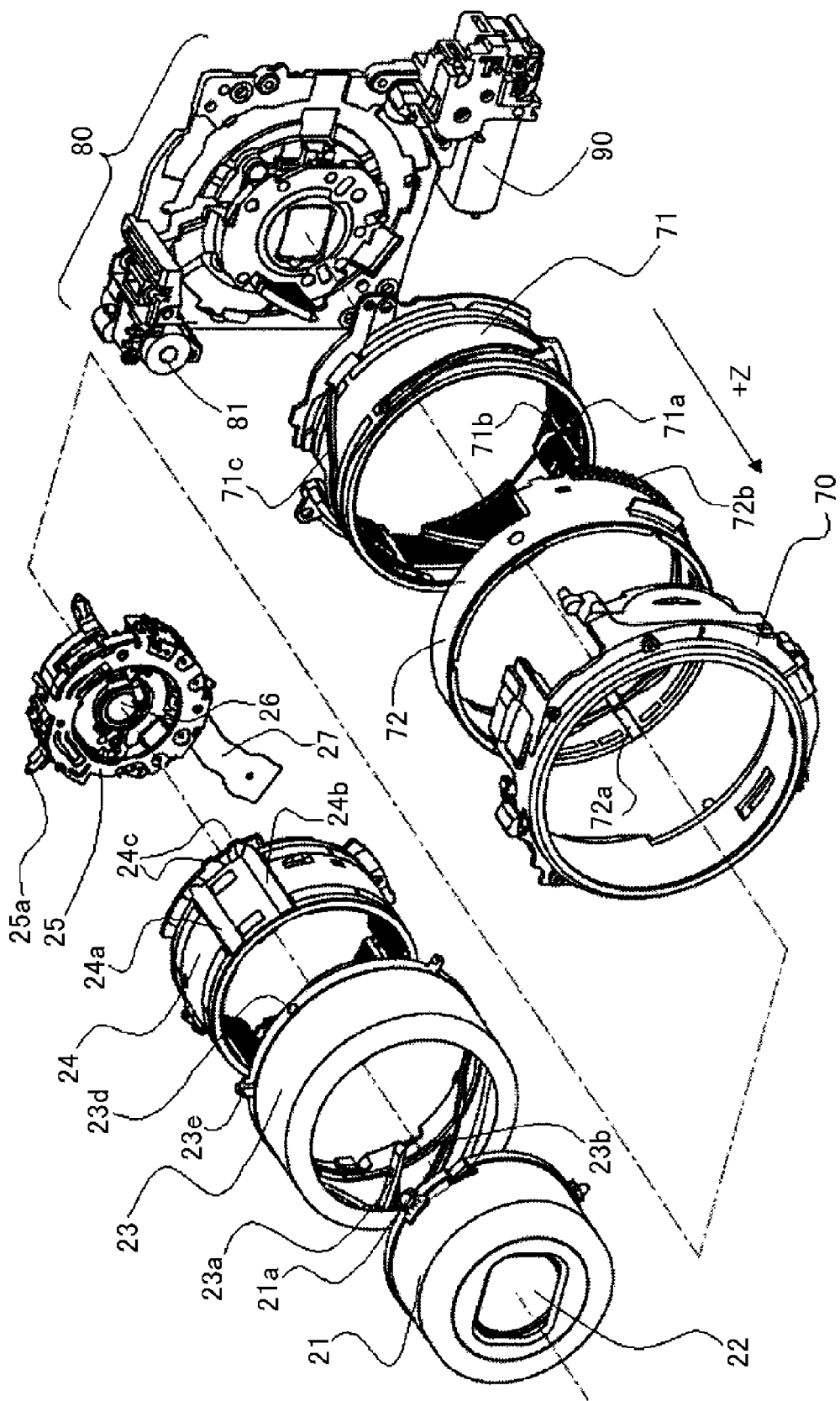
FIG. 4 is an exploded perspective view of the lens barrel illustrated in FIG. 2.

FIG. 3 is a front view of the lens barrel 3, and FIG. 4 is an exploded perspective view of the lens barrel 3. In FIG. 3, the right side is defined as a +X direction, and the upper side is defined as a +Y direction. In FIG. 4, an optical axis direction on the object side is defined as a +Z direction.

The lens barrel 3 is of a two-step retractable type, and can change its length in the optical axis direction (Z direction) illustrated by an alternate long and short dash line in FIG. 4 between the image pickup time and the retraction time. The lens barrel 3 includes an image pickup lens group including three groups, i.e., a first lens 22, a second lens 26, and a focus lens 82. The first lens 22 is held by a first lens holder 21 that serves as a first cylinder unit, the second lens 26 is held by a second lens unit 25 that serves as a second cylinder unit, and the focus lens 82 is held by the focus lens holder 83 that serves as a third cylinder unit.

As illustrated in FIG. 4, the second cylinder unit includes a cam ring (cam cylinder) 23, a straightforward movement cylinder 24, and the second lens unit 25 that are bayonet-coupled with each other.

The cam ring 23 is configured to drive the first lens holder 21, and the straightforward movement cylinder 24 is configured to restrict a straightforward movement of the first lens holder 21 in the optical axis direction. Due to the bayonet coupling, the cam ring 23 is rotatably supported by the straightforward movement cylinder 24, and the cam ring 23 and the straightforward movement cylinder 24 are moved as a single unit in the Z direction.

Drive cams (cam grooves) 23a configured to drive the first lens holder 21 are formed on the inner circumferential surface of the cam ring 23, and the first lens holder 21 has three cam pins 21a engageable with the drive cams 23a of the cam ring 23 on the outer circumference surface. The drive cam 23a controls a movement (amount) of the first lens holder 21 in the optical axis direction.

In addition, drive cams (cam grooves) 23b configured to drive the second lens unit 25 are formed on the inner circumferential surface of the cam ring 23. The drive cam 23b is engaged with a cam pin 25a of the second lens unit 25, and the drive cam 23b can control a movement (amount) of the second lens unit 25 in the optical axis direction.

Provided on an outer circumferential surface of the cam ring 23 are three cam pins 23d each engageable with a corresponding one of three drive cams 71a of a fixture cylinder 71 of a third cylinder unit and three drive pins 23e engageable with the drive ring 72. The cam pins 23d and the drive pins 23e are respectively provided at 120° intervals around the optical axis. Each cam pin 23d is engaged with the drive cam 71a of the fixture cylinder 71, and the cam ring 23 is configured to move in the optical axis direction following the locus of each drive cam 71a. The drive pin 23e is engaged with a drive groove (key groove) 72a of the drive ring 72, and the cam ring 23 rotates with the drive ring 72.

The straightforward movement cylinder 24 has a straightforward movement groove 24a configured to restrict a movement (amount) of the first lens holder in the optical axis direction, a straightforward movement groove 24b configured to restrict a movement (amount) of the second lens unit 25 in the optical axis direction, and a restriction member 24c configured to restrict a movement (amount) of the fixture cylinder 71 in the optical axis direction.

The second lens unit 25 includes the second lens 26, a shutter unit behind the second lens 26, a flexible printed circuit board 27 configured to supply the power to the shutter unit, and the three cam pins 25a provided on the outer circumference surface and engaged with the drive cam 23b of the cam ring 23.

The flexible printed circuit board 27 is inserted into a hole (not illustrated) of the fixture cylinder 71 from the second lens unit 25 and led out of the inside of the drive ring 72 to the outside (of the lens barrel 3) via a groove 72d in the drive ring 72 of the third cylinder unit.

Since the movements of the first lens holder 21 and the second lens unit 25 are restricted in the optical axis direction by the straightforward movement cylinder 24, as the cam ring 23 rotates, the first lens holder 21 and the second lens unit 25 move in the Z direction (optical axis direction) following the cam loci of the drive cams 23a and the drive cams 23b. The drive cam 23a and the drive cam 23b provide a smaller ratio between a projection amount and a rotational angle (or a smaller so-called cam lead) as the rotational angle of the cam ring 23 is larger, and can stabilize driving of the lens barrel.

The third unit includes a cover member 70, the fixture cylinder 71, the drive ring (rotary cylinder) 72, and a focus unit 80. The focus unit 80 includes a focus drive motor 81, a zoom drive motor 90, an image pickup device, etc.

The cover member (cover cylinder) 70 covers the entire lens barrel 3, and receives the thrust unsteadiness of the drive ring 72.

The fixture cylinder 71 is arranged at the outer circumference of the cam ring 23. At the inner circumference of the fixture cylinder 71, there are provided the drive cam (cam grooves) 71a engageable with the cam pins 23d and configured to restrict the movement of the cam ring 23, and the straightforward movement restricting grooves (cam grooves) 71b configured to restrict the straightforward movement of the straightforward movement 24. The fixture cylinder 71 possesses a drive groove 71c having a perforation hole shape and the same cam locus as that of the drive cam 71a. The drive pin 23e of the cam ring 23 is inserted into the drive groove 71c.

The drive ring 72 is provided at the outer circumference of the fixture cylinder 71, and has a hollow cylinder shape, and is configured to rotate the cam ring 23. The drive ring 72 includes the drive groove 72a engageable with the drive pin 23e of the cam ring 23. The drive pin 23e of the cam ring 23 is engaged with the drive groove 72a of the drive ring 72 via the drive groove 71c of the fixture cylinder 71. As the drive ring 72 rotates, the rotational force is transmitted to the cam ring 23. A gear 72b is provided on the outer circumference surface of the hollow cylinder shape of the drive ring 72, and the drive ring 72 is configured to rotate around the optical axis via the gear 72b.

JPs 7-13059 and 2004-233925 are less likely to realize a high magnification barrel because they helicoidally drive the cam ring and the degree of freedom of driving of the cam ring in the optical axis direction is low. On the other hand, the gear 72b maintains the degree of freedom of driving of the cam ring in the optical axis direction because the tooth trace (or valley extending direction) is parallel to the optical axis direction.

Figure 5:
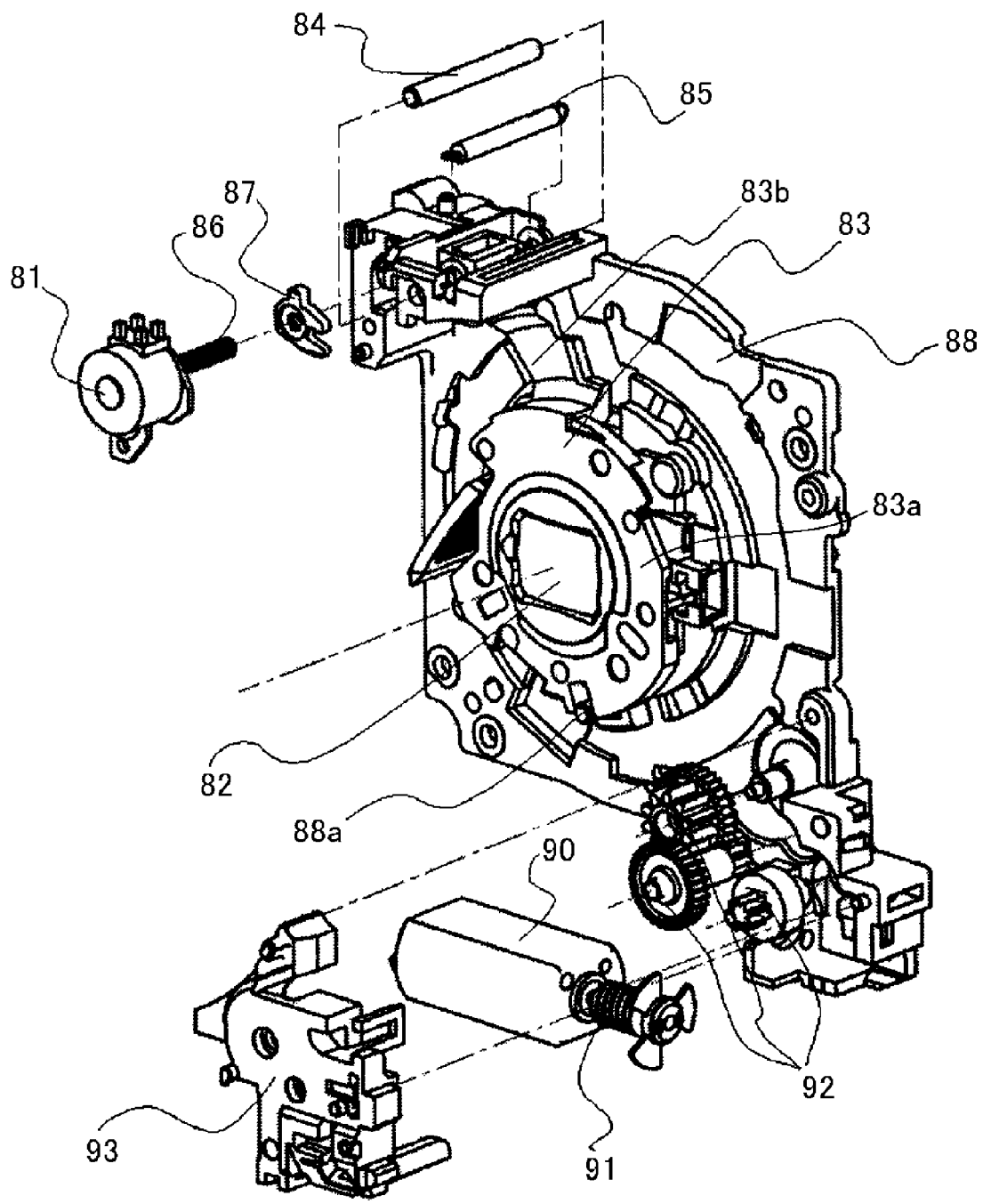
FIG. 5 is an exploded perspective view of a focus unit of the lens barrel illustrated in FIG. 4.
Figure 6:
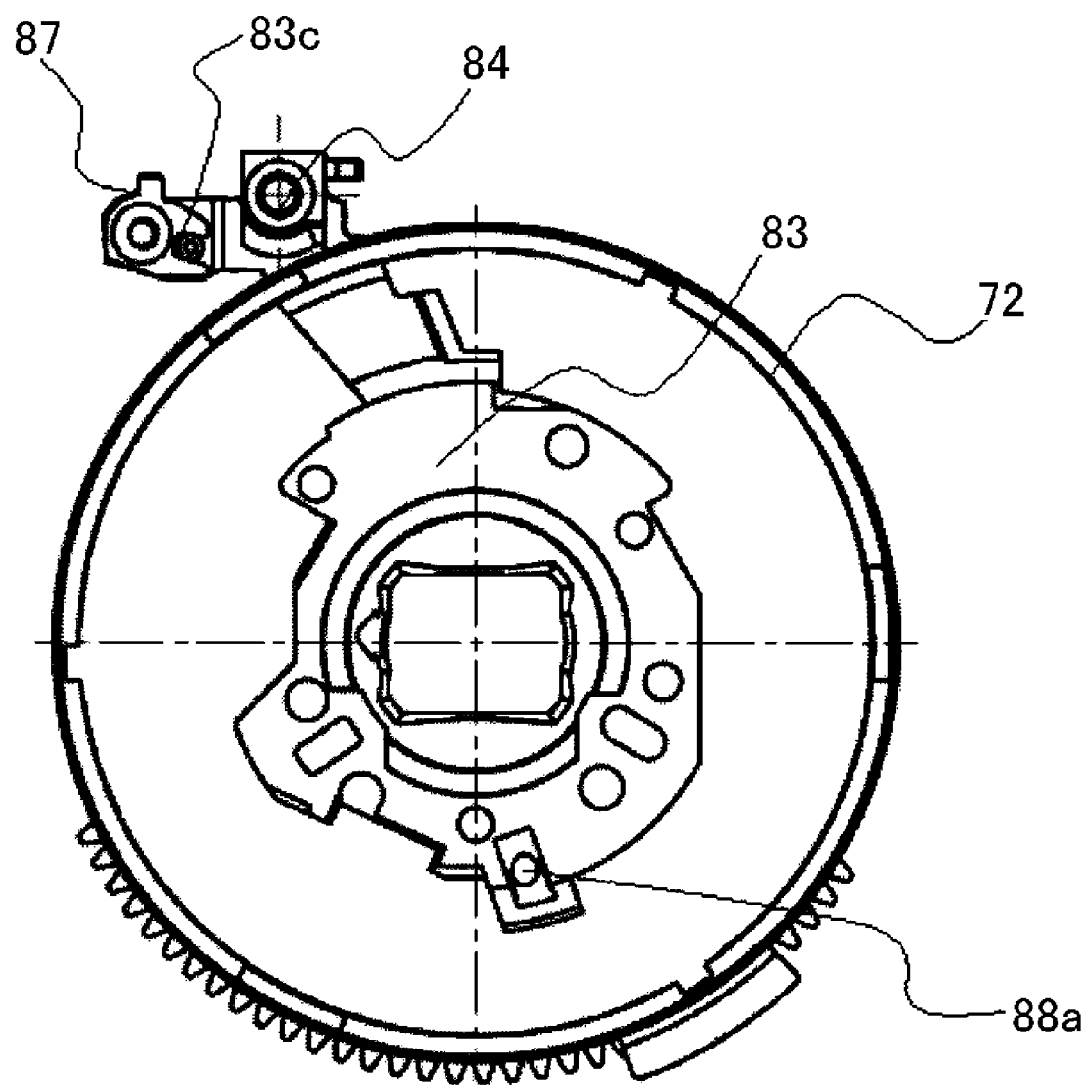
FIG. 6 is a front view of a drive ring and a focus lens holder illustrated in FIG. 4.

The focus unit 80 sits behind the fixture cylinder 71 in the Z direction. FIG. 5 is an exploded perspective view of the focus station. FIG. 6 is a front view of the focus unit 80. As illustrated in FIG. 5, the focus unit 80 includes a focus drive motor 81, a focus station connected to the focus drive motor 81, a zoom drive motor 90, and a reduction gear unit connected to the zoom drive motor 90.

The focus station includes a focus lens 82, a focus lens holder 83, a guide shaft 84, a bias spring 85, and a base member 88.

The focus drive motor 81 is adapted to drive the focus lens 82, and is provided in an area defined by the −X direction and +Y direction in FIG. 3. A drive screw 86 is provided on a motor rotating shaft of the focus drive motor 81. The drive screw 86 rotates by electrifying the focus drive motor 81.

The focus lens 82 is adapted to move in the optical axis direction in adjusting a focus of the image pickup lens.

The focus lens holder 83 includes a body 83a located in of the drive ring 72 and configured to hold the focus lens 82, and an arm 83b that extends from the body 83a to the outside of the drive ring 72 (and the fixture cylinder 71) along the radial direction. The focus lens holder 83 is engaged with the guide shaft 84 via the arm 83b, and adapted to move in the optical axis direction relative to the drive ring 72.

The guide shaft (first shaft) 84 restricts a rotation of the focus lens holder 83, and guides a movement of the focus lens holder 83 in the optical axis direction (Z direction). The guide shaft 84 is fixed onto the base member 88.

The bias spring 85 is a tension spring attached to the focus lens holder 83. The bias spring is hung between the base member 88 and the focus lens holder 83, and applies a force to the focus lens holder 83 in the +Z direction.

The drive nut 87 is provided so that it can be screwed by the drive screw 86, and its rotation is restricted by a positioning shaft 83c of the focus lens holder 83, as illustrated in FIG. 6. Since a rotation of the focus lens holder 83 is restricted by the guide shaft 84 and forced in the +Z direction by the bias spring 85, the drive nut 87 can move in the Z direction due to the screw operation when the drive screw 86 rotates. As the drive nut 87 moves, the focus lens holder 83 can move in the Z direction.

The base member 88 holds the zoom unit and the focus station, such as the focus lens holder 83 and the focus drive motor 81. The base member 88 is coupled with the fixture cylinder 71. In the meanwhile, FIG. 6 illustrates only a stabilization shaft (second shaft) 88a of the base member 88 for illustration convenience.

According to JP 2004-233925, the guide shaft and the stabilization shaft are arranged outside of the lens barrel and thus the lens barrel becomes large. Moreover, the arm of the lens holder becomes long, and the lens holder comes to have insufficient strength. As a result, decentering, inclinations, etc. are likely to occur during driving, causing image blurs.

On the other hand, according to this embodiment, the stabilization shaft 88a is fixed onto the base member 88 and engaged with the body 83a of the focus lens holder 83, as illustrated in FIGS. 5 and 6. The guide shaft 84 and the stabilization shaft 88a are adapted to guide the movement of the focus lens holder in the optical axis direction and to restrict its rotation around the optical axis. The guide shaft 84 is longer than the stabilization shaft 88a. Since the guide shaft 84 is located near the stabilization shaft 88a, the vibration of the focus lens holder 83 at the movement time can be reduced. In addition, the structure in which the stabilization shaft 88a is arranged inside of the drive ring 72 is effective to the miniaturization of the lens barrel 3.

The zoom drive motor 90 is arranged at an area defined by the +X direction and the −Y direction in FIG. 3, and configured to rotate the drive ring 72. As illustrated in FIG. 5, the zoom drive motor 90 is attached to the base member 88.

The reduction gear unit includes, as illustrated in FIG. 5, a worm gear 91, a reduction gear row 92, and a gear cover 93. The worm gear 91 is attached as one unit to the top of the motor rotating shaft of the zoom drive motor 90, and the reduction gear row 92 is attached so that it can be connected to the worm gear 91. The reduction gear row 92 is connected to the gear 72b of the drive ring 72. The tooth trace (or valley) of the gear of the reduction gear row 92 engageable with the gear 72b is parallel to the optical axis direction. The gear cover 93 is attached to the base member 88, and restricts unsteadiness of the reduction gear row 92 in the Z direction.

In zooming, when the camera 1 powers on, the zoom drive motor 90 is electrified and the drive ring is rotated via the reduction gear row 92. As the drive ring 72 rotates, the cam ring 23 rotates due to the engagement between the drive grooves 72a and the drive pins 23e of the cam ring 23. Then, the cam ring 23 rotates and projects or retracts in the optical axis direction pursuant to the locus of the cam groove 71a of the fixture cylinder 71. As the cam ring 23 rotates, the first lens holder 21 and the second lens unit 25 project or retract in the optical axis direction according to the loci of the drive cams 23a and the drive cams 23b inside the cam ring 23. As a result, the lens barrel 3 can projects or retracts the image pickup lens to a required position, and drives the focus lens 82 for image pickup.

Figure 7:
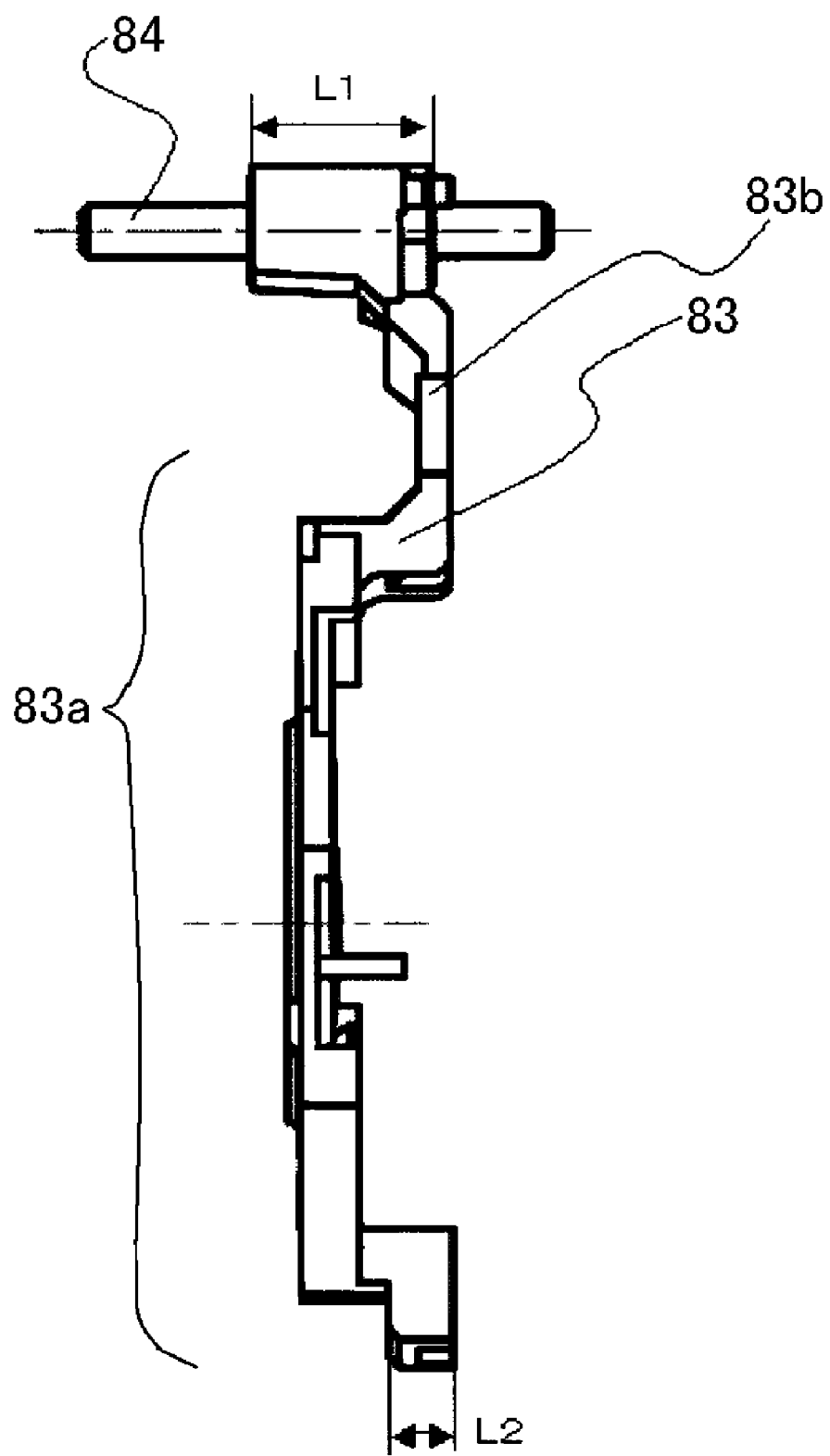
FIG. 7 is a side view of the focus lens holder and a guide shaft illustrated in FIG. 5.

FIG. 7 is a side view of the focus lens holder 83 and the guide shaft 84. The focus station needs to maintain a large engagement length L1 so as to correctly move the focus lens 82 straightforward in the Z direction. The small engagement length L1 may cause the focus lens holder 83 to incline due to the influence of the bias spring 85, results in the stick-slip phenomenon, which deteriorates precise and fast driving in driving the focus lens holder 83.

In this case, when the engagement length L1 is set in of the fixture cylinder 71, the arrangement of the second lens unit 25 etc. is restricted as the engagement length L1 becomes larger. As a result, the lens barrel 3 needs to be larger both in the radial direction and in the thickness direction contrary to the miniaturization demand. Accordingly, this embodiment arranges the focus station outside of the drive ring 72, and increases the degree of freedom of the arrangement in the fixture cylinder 71 inside of the drive ring 72, thereby miniaturizing the lens barrel 3.

On the other hand, a length L2 engageable with the stabilization member 88a is less influenced by the stick-slip phenomenon, can be made smaller than the engagement length L1, and does not hinder the miniaturization of the lens barrel 3 even when the length L2 is set inside of the drive ring 72.

Figure 1:
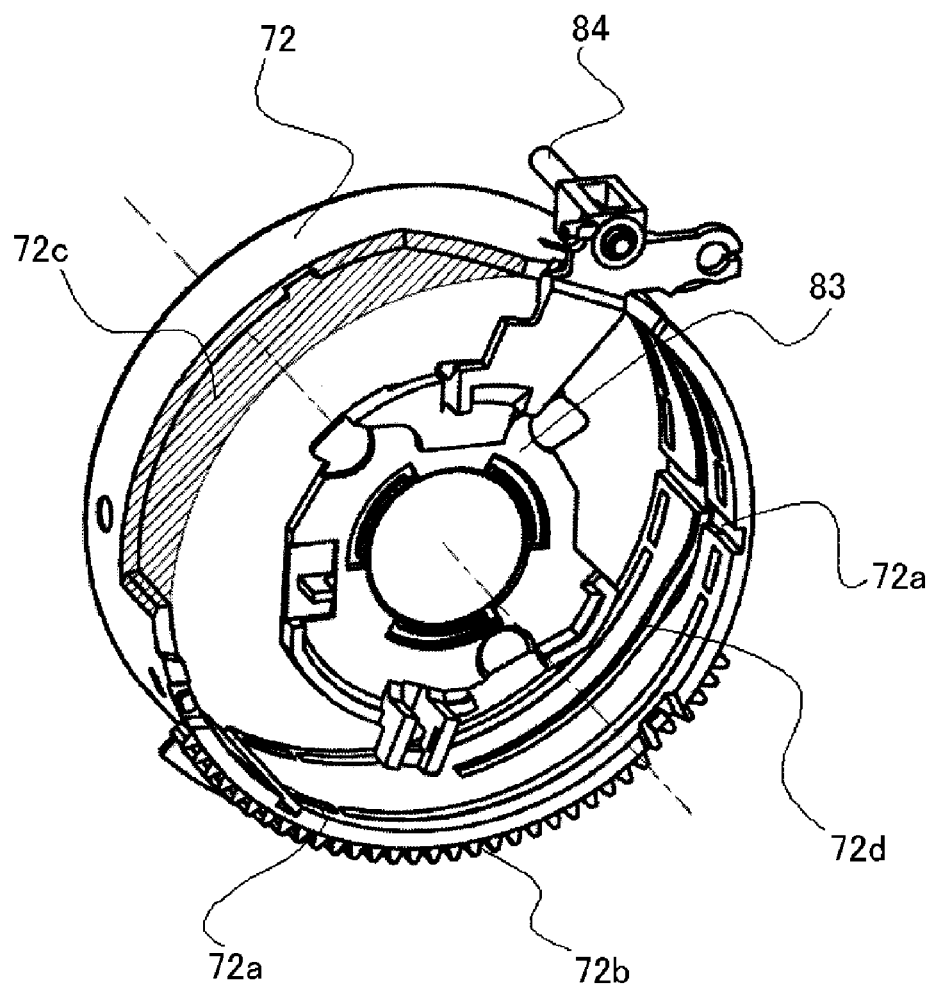
FIG. 1 is a partially perspective view of the lens barrel according to this embodiment.
Figure 8:
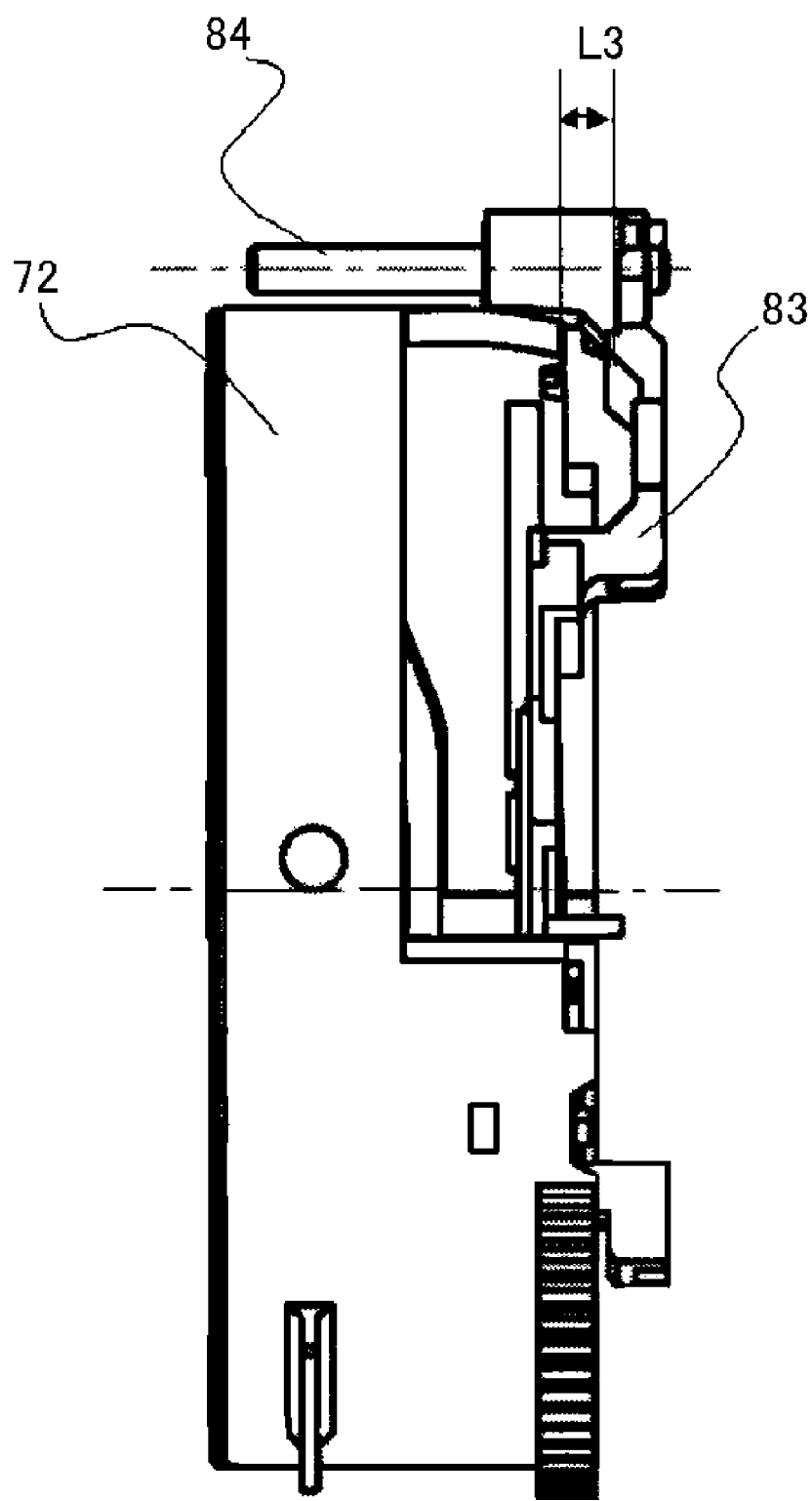
FIG. 8 is a side view illustrated in FIG. 1.
Figure 9:
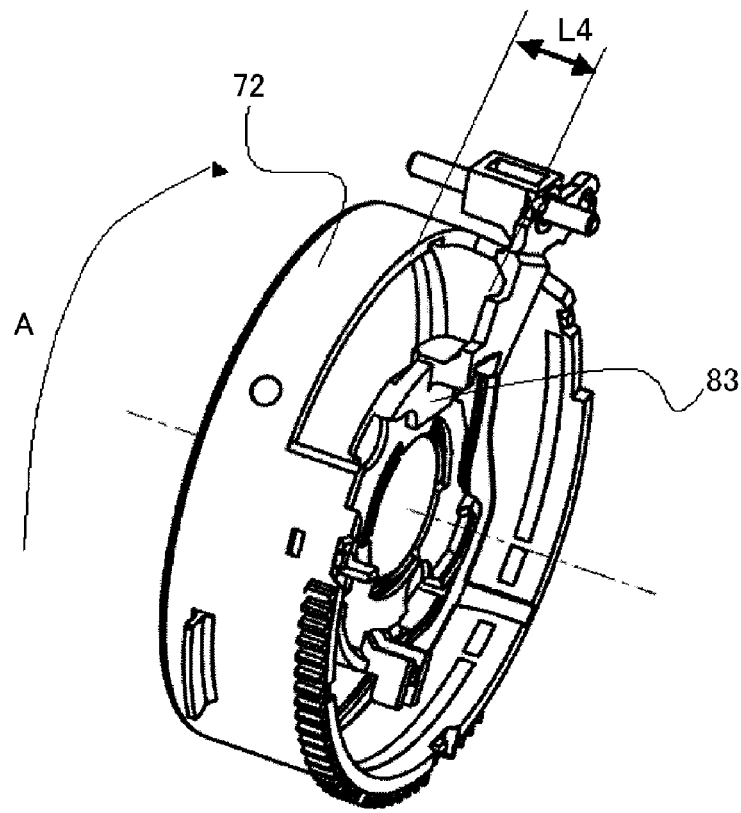
FIG. 9 is a perspective view viewed from −Z direction illustrated in FIG. 1.

FIG. 1 is a perspective view of the focus lens holder 83 and the guide shaft 84 in the −Z direction. FIG. 8 is a side view of FIG. 1. FIG. 9 is a perspective view viewed from in the −Z direction. FIGS. 1 and 8 are views of a retraction state of the camera 1, and FIG. 9 is an image pickup state after the drive ring 72 rotates.

The drive ring 72 has a notch 72c at a beveled position illustrated in FIG. 1, which extends in the circumferential direction. As illustrated in FIG. 8, at the retraction time of the camera 1, the focus lens holder 83 retracts in the −Z direction, and a distance becomes L3 between the surface corresponding to the end surface of the notch 72c of the drive ring 72 and the arm 83b.

As illustrated in FIG. 9, when the camera 1 powers on, the drive ring 72 rotates in the A direction, and the lens barrel 3 projects. As the drive ring 72 rotates, the notch 72c rotates and the arm 83b of the focus lens holder 83 can enter the notch 72c and retreat from the notch 72c along the Z direction in a range of a width L4 of the notch 72c of the drive ring 72. At the retraction state, the arm 83b retreats from the notch 72c and may enter the notch 72c at the image pickup state. When the arm 83b enters the notch 72c of the drive ring 72, the focus lens 82 can adjust a focus.

A conventional drive ring has no notch 72c, and thus it is necessary to maintain the width L4 outside of the drive ring in the −Z direction. As a consequence, the lens barrel 3 has to be large. On the other hand, this embodiment provides the drive ring 72 with the notch 72c, maintains the focus stroke, and makes small the lens barrel 3.

Figure 10:
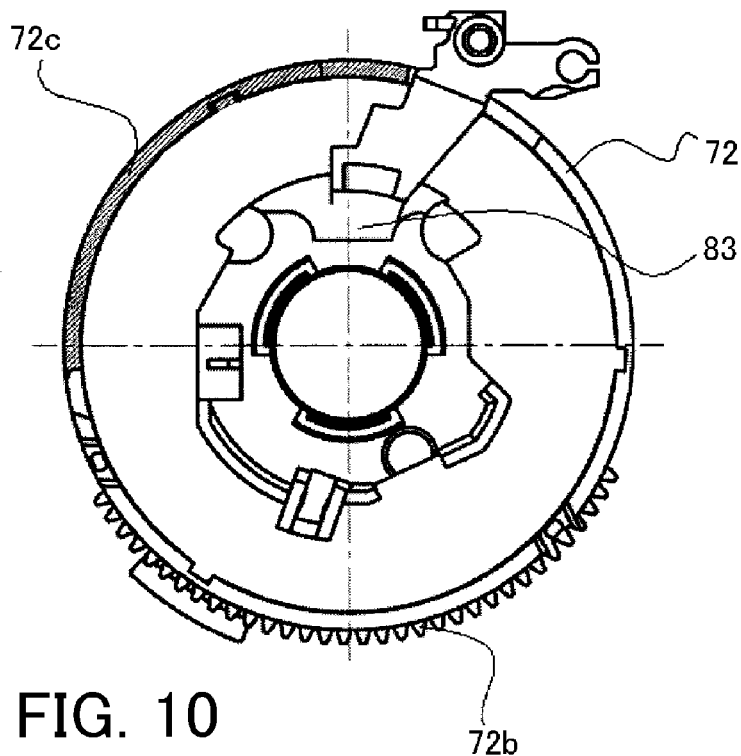
FIG. 10 is a rear view of FIG. 1.

FIG. 10 is a back view of the drive ring 72 and the focus lens holder 83. The notch 72c is arranged with a different phase from that of the gear 72b. In other words, the notch 72c of the drive ring 72 is arranged so that it cannot superimpose the gear 72b. Therefore, the drive ring 72 in the Z direction can be made short in the area having the notch 72c and can be made long in the area having the gear 72b, while the rotational angle of the drive ring 72 can be set large.

The drive ring 72 is provided with three driving grooves 72a at regular intervals of 120°. Driving of the cam ring 23 is stable even when the drive ring 72 has the notch 72c because two driving grooves 72a are engaged with the cam ring 23 and the driving load lowers as the rotational angle becomes larger.

Since a large projection amount of the cam ring 23 can be maintained by driving the cam ring 23 in an area in which the drive ring 72 is long, the lens barrel 3 with a high magnification can be realized.

In this embodiment, the gear 72b and the notch 72c are arranged in rotational symmetry, but the present invention is not limited to the arrangement of this embodiment as long as they do not overlap in the Z direction. Hence, this embodiment can increase the degree of freedom of the arrangement of the gear 72b and the notch 72c.

The flexible printed circuit board 27 is attached to the second lens unit 25 so as to electrify the shutter unit, etc. The flexible printed circuit board 27 connects the inside of the drive ring 72 to the outside of the drive ring 72. In order to lead the flexible printed circuit board 27, the drive ring 72 needs a perforation hole (perforation groove). On the other hand, it is necessary to maintain the rigidity of the drive ring 72 to some extent for stable projecting and retracting. Accordingly, this embodiment arranges the groove 72d of the drive ring 72 outside of the area of the notch 72c in the circumferential direction (so that they cannot overlap each other). Since the drive ring 72 is long in the Z direction except for the area of the notch 72c, its rigidity can be maintained even when the groove 72d is formed.

Thereby, a requirement of enlarging driving of the focus lens 82 and a requirement of enlarging a driving amount of the lens barrel 3 can be reconciled. While this embodiment discusses driving of the focus lens 82, the present invention is applicable to any unit similar to driving of the focus lens 82 as long as the unit needs to transmit driving from the outside of the lens barrel 3 (or outside of the drive ring 72) to the inside of the lens barrel 3.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The image pickup apparatus is applicable to image pickup of an object.

This application claims the benefit of Japanese Patent Application No. 2009-165341, filed Jul. 14, 2009, which is hereby incorporated by reference herein in its entirety.

What is claimed is:

1. A lens barrel comprising:
   a drive ring having a hollow cylindrical shape and a gear by which the drive ring is configured to rotate around an optical axis;
   a lens holder configured to move in an optical axis direction relative to the drive ring and to hold a lens and located inside of the drive ring, the lens holder including an arm extending to outside of the drive ring;
   a first drive unit configured to rotate the drive ring;
   a second drive unit configured to move the lens holder in the optical axis; and
   a guide shaft arranged outside of the drive ring,
   wherein the lens holder is engaged with the guide shaft via the arm, and adapted to move in the optical axis relative to the drive ring, and
   wherein the drive ring has a notch that extends in a circumferential direction of the drive ring so that the notch does not overlap the gear in the circumferential direction of the drive ring, and the arm of the lens holder is configured to retreat from the notch of the drive ring in a retraction state and to be able to enter the notch in an image pickup state.

2. The lens barrel according to claim 1, wherein the gear includes a tooth trace parallel to the optical axis direction.

3. A lens barrel comprising:
   a drive ring having a hollow cylindrical shape and configured to rotate around an optical axis;
   a lens holder configured to move in an optical axis direction relative to the drive ring and to hold a lens and located inside of the drive ring, the lens holder including an arm extending to outside of the drive ring;
   a flexible printed circuit board configured to connect inside of the drive ring to outside of the drive ring;
   a first drive unit configured to rotate the drive ring;
   a second drive unit configured to move the lens holder in the optical axis; and
   a guide shaft arranged outside of the drive ring,
   wherein the lens holder is engaged with the guide shaft via the arm, and adapted to move in the optical axis relative to the drive ring, and
   wherein the drive ring has a notch and a perforation groove so that the notch and the perforation groove does not overlap each other in a circumferential direction, and the arm of the lens holder is configured to retreat from the notch of the drive ring in a retraction state and to be able to enter the notch in an image pickup state, the flexible printed circuit board perforating through the perforation groove of the drive ring.

4. An image pickup apparatus comprising
   the lens barrel, the lens barrel includes a drive ring having a hollow cylindrical shape and a gear by which the drive ring is configured to rotate around an optical axis, a lens holder configured to move in an optical axis direction relative to the drive ring and to hold a lens and located inside of the drive ring, the lens holder including an arm extending to outside of the drive ring, a first drive unit configured to rotate the drive ring, a second drive unit configured to move the lens holder in the optical axis, and a guide shaft arranged outside of the drive ring,
   wherein the lens holder is engaged with the guide shaft via the arm, and adapted to move in the optical axis relative to the drive ring, and
   wherein the drive ring has a notch that extends a circumferential direction of the drive ring so that the notch does not overlap the gear in the circumferential direction of the drive ring, and the arm of the lens holder is configured to enter and retreat from the notch of the drive ring in a retraction state and to be able to enter the notch in an image pickup state.

* * * * *